United States Patent [19]

Reichert

[11] Patent Number: 4,865,899

[45] Date of Patent: Sep. 12, 1989

[54] LAMINATED CONTAINMENT STRUCTURE

[75] Inventor: Charles R. Reichert, Whiting, Ind.

[73] Assignee: Fabrico Manufacturing Corp., Chicago, Ill.

[21] Appl. No.: 85,636

[22] Filed: Aug. 12, 1987

[51] Int. Cl.⁴ ............................................. B32B 3/00
[52] U.S. Cl. ................................... 428/189; 428/190; 428/192; 428/284; 428/287; 428/300; 428/296
[58] Field of Search ....................... 428/44, 57, 58, 60, 428/189, 190, 192, 193, 296, 300, 284, 287

[56] References Cited

U.S. PATENT DOCUMENTS

| | | | |
|---|---|---|---|
| 4,303,712 | 12/1981 | Woodroof | 428/58 |
| 4,336,086 | 6/1982 | Rast | 428/57 |
| 4,461,794 | 7/1984 | Bischoff et al. | 428/57 |
| 4,535,015 | 8/1985 | Bruner et al. | 428/58 |
| 4,589,804 | 5/1986 | Paeglis et al. | 428/57 |
| 4,682,911 | 7/1987 | Moreland | 405/53 |

Primary Examiner—James J. Bell
Attorney, Agent, or Firm—Dressler, Goldsmith, Shore, Sutker & Milnamow, Ltd.

[57] ABSTRACT

A laminated containment structure, and method of making, are disclosed. In one form, the containment structure is configured as an expansive secondary containment liner particularly suited for use in association with bulk storage tanks for hydrocarbon fuels and the like. In an alternate embodiment, the structure is configured as a sealable container suited for storage and handling of harardous materials. The containment structure is configured for efficient manufacture and installation, as well as a high degree of resistance to puncture and leakage. Manufacture is facilitated by first forming a plurality of elongated laminated strips each comprising a lamination of a polyester elastomeric layer and at least one non-woven geotextile fabric layer. In the preferred form, a pair of the fabric layers are bonded to respective opposite expansive surfaces of each elastomeric layer, with the fabric layers offset from respective edge portions of the elastomeric layer to facilitate bonding of the elastomeric layers together to form the containment structure with a substantially uninterrupted expanse or continuum of the polyester elastomer.

2 Claims, 3 Drawing Sheets

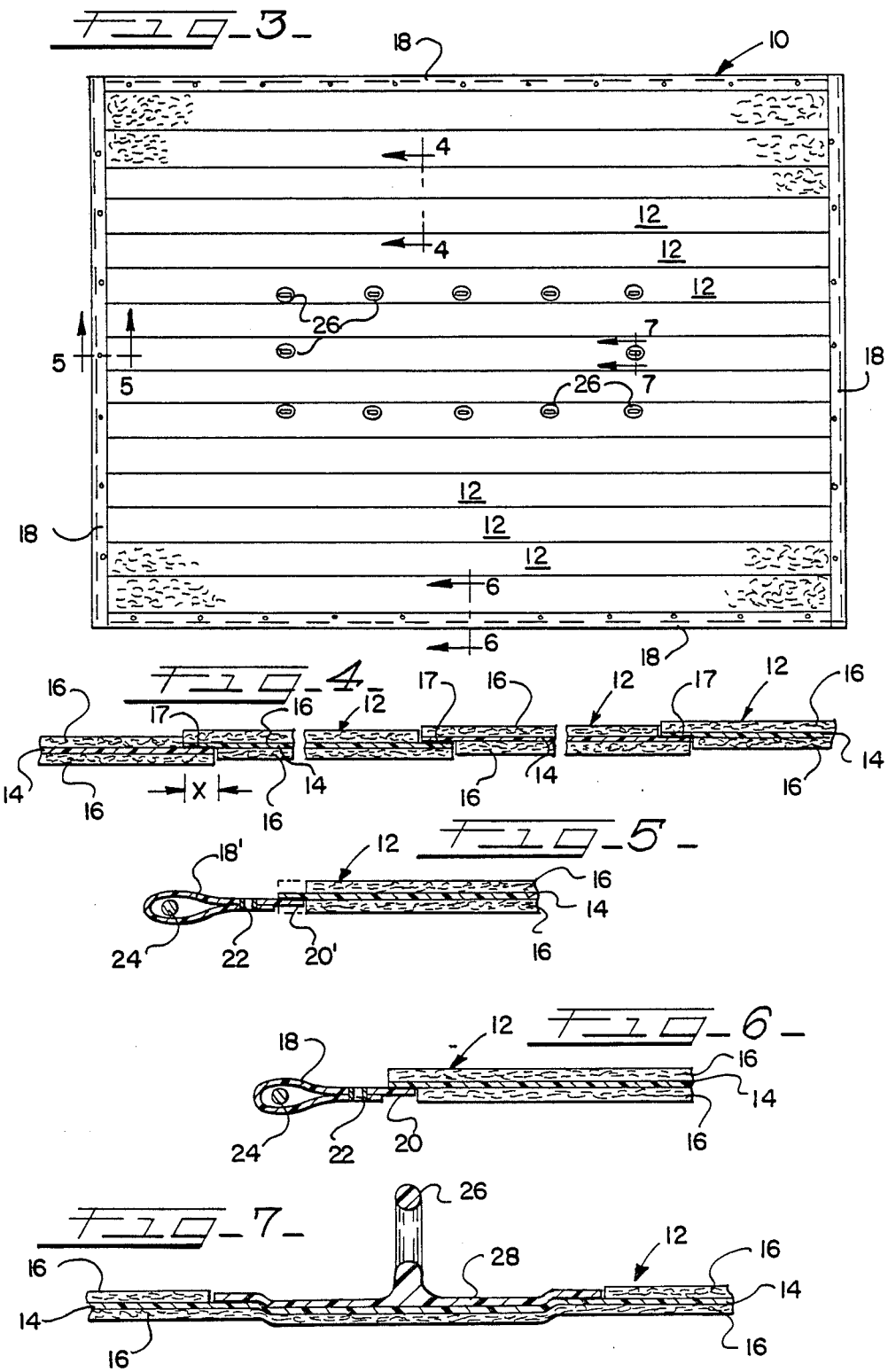

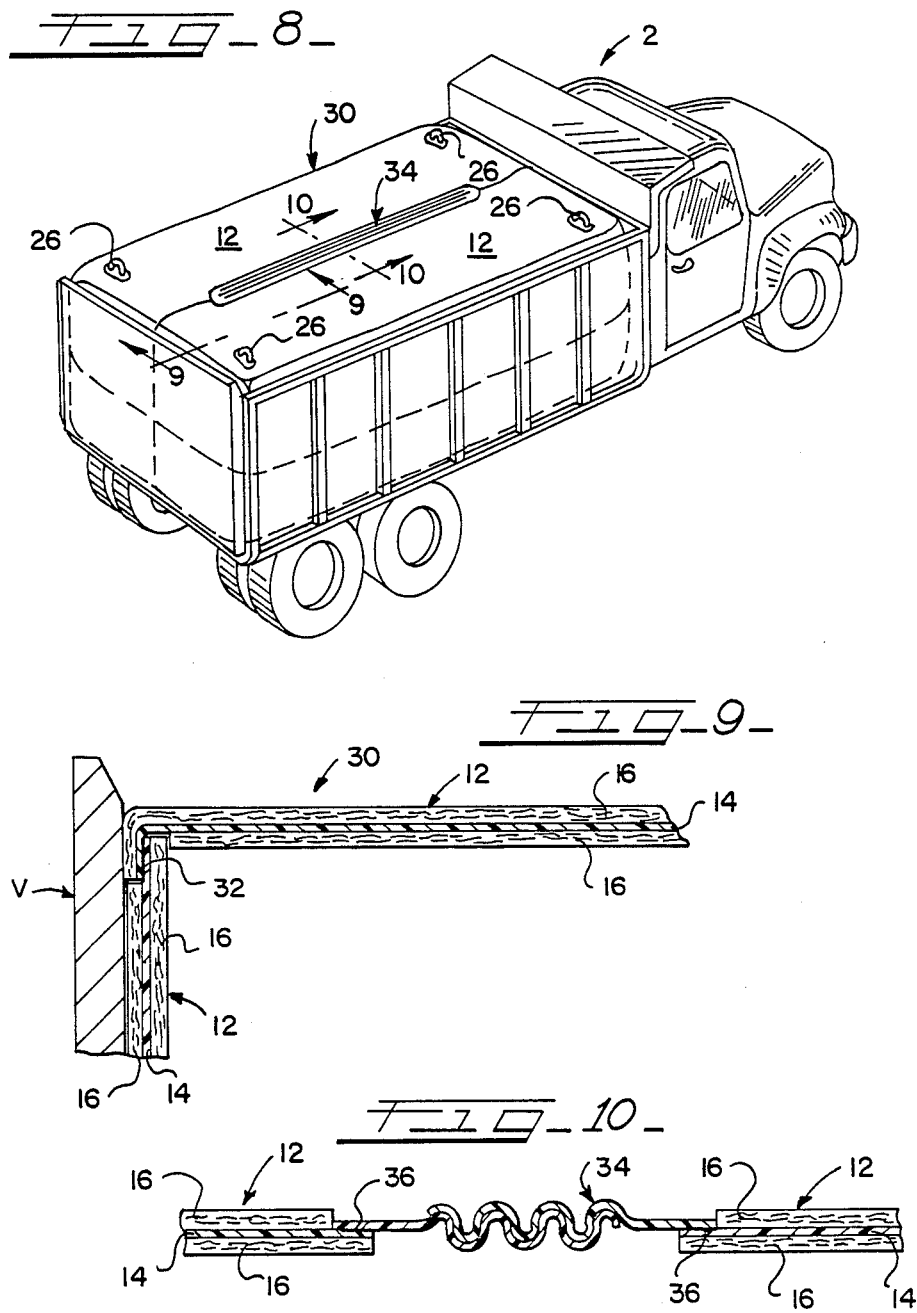

LAMINATED CONTAINMENT STRUCTURE

TECHNICAL FIELD

The present invention relates generally to arrangements such as for use as secondary containments beneath bulk storage tanks and for handling hazardous materials, and more particularly to a laminated containment structure formed from laminations of a highly impervious elastomer and associated geotextile fabric layers which is configured for efficient manufacture, versatile use, and extremely high resistance to puncture and leakage.

BACKGROUND OF THE INVENTION

Underground and aboveground bulk storage tanks are very widely used for containment of all manner of fuels and chemicals. Tanks of this nature are typically fabricated from steel or glass fibre reinforced plastic, and depending upon the environment of the installation and the material being contained, can be subject to leakage. It is significant to note that by some estimates, nearly one-third of the underground storage tanks in the United States may be subject to some leakage.

Depending upon the nature of the material being stored, unchecked leakage of a tank can be very detrimental to the environment. Leakage of hazardous or corrosive materials can percolate into ground-water below the storage facility, with resultant contamination. At the very least, the cost of material which is lost or contaminated can be quite high.

In view of this, well-designed storage facilities are provided with so-called secondary containment devices in association with underground and aboveground storage tanks, piping systems, processing pits and ponds, and the like. In fact, such secondary containments are required by law in many locations. To this end, expansive, sheet-like liners of suitably impervious material are employed such as for disposition in the excavation for an underground storage tank, or for positioning within a suitable depression or pit beneath an aboveground tank or piping system.

While certain thermoplastic polyester elastomers can be formulated to be highly impervious to diesel fuel, gasoline, chemical solvents, and other volatile and/or corrosive materials, sheets of such thermoplastics typically do not exhibit sufficient strength and resistance to puncture as is desirable for use as secondary containments. Needless to say, the very nature of the application of secondary containments requires extremely high resistance to puncture and leakage. Additionally, the widely differing requirements of various applications, as well as the typically large physical dimensions required, mandate that a secondary containment arrangement lend itself to consistent and reliable manufacture, versatile use, and efficient installation.

There also exists a need for containment structures suited for handling and storage of hazardous or contaminated materials. While the above-described secondary containments are intended to prevent environmental contamination, it is nevertheless sometimes necessary to store or transport soil or other material which has been contaminated. Again, a structure exhibiting a high degree of imperviousness to corrosive or hazardous substances is required, with puncture-resistance being necessary to facilitating handling. Further, such an arrangement is preferably configured for closing and sealing after the material to be contained has been placed therein.

With the above goals in mind, the containment structure liner of the present invention has been particularly configured for very high resistance to puncture and leakage, while at the same time lending itself to cost-effective manufacture, highly versatile use, and straightforward installation.

SUMMARY OF THE INVENTION

The containment structure liner embodying the principles of the present invention provides a highly reliable arrangement for preventing environmental contamination from any leakage of an associated storage tank, piping system, or the like, as well as providing a highly secure arrangement for storing and transporting contaminated or other hazardous material. Notably, the present construction includes a plurality of elongated laminated strips each of which includes a polyester elastomeric layer, and at least one geotextile fabric layer bonded thereto in face-to-face relationship. The laminated strips are bonded together along their lateral edge portions in such a fashion as to provide an essentially uninterrupted expanse or continuum of the polyester elastomeric layers. By this arrangement, the elastomeric layers provides an uninterrupted barrier against penetration by contaminants, with the associated geotextile fabric providing enhanced strength and puncture-resistance for the construction.

A number of features of the containment structure, as well as the herein disclosed method of fabrication, promote its efficient manufacture and reliable use. As noted, each laminated strip of the construction includes at least one geotextile fabric layer bonded in face-to-face relation with a respective expansive surface of the associated polyester elastomeric layer. In order to facilitate bonding of the elastomeric layers of adjacent ones of the strips together to provide the desired uninterrupted expanse of the elastomer, it is presently preferred that the geotextile fabric layer of each strip be offset relative to one of the lateral edge portions of the respective elastomeric layer.

In the preferred illustrated form, wherein a nonwoven geotextile fabric layer is bonded to respective opposite surfaces of the associated elastomeric layer, each fabric layer is offset from a respective one of the lateral edge portions of the elastomer. Thus, the adjacent laminated strips can be efficiently joined by bonding the exposed edge portions of the respective elastomeric layers, with such bonding preferably being effected by fusing the layers such as by radio frequency or sonic welding.

When the present containment structure is configured as a secondary containment liner, efficient installation is further promoted by the features of the preferred construction. In order to facilitate securement of the liner in place within an associated excavation or the like, border layers are provided along the laterally opposite and longitudinally opposite edge portions of the joined together laminated strips. Each border layer is preferably bonded along its inner edge portion to the uninterrupted expanse of the joined together elastomeric layers of the laminated strips, with each border layer folded-under and joined to itself with spaced apart grommets. A reinforcing rope is preferably provided which extends substantially continuously within the folded border layers, with the spaced apart grommets preferably configured for receiving stakes to facilitate securement of the liner construction in place within an excavation.

In a further embodiment, the present containment structure is configured as a substantially closed, sealable container. A selectively sealable closure arrangement facilitates filling of the container with contaminated material or the like, and subsequent sealing for storage, shipment, or decontamination. Further, the sealable container can readily be configured for use in the nature of a secondary container by fitting the container to substantially enclose a bulk storage tank or like structure.

Other features and advantages of the present invention will become readily apparent from the following detailed description, the accompanying drawings, and the appended claims.

BRIEF DESCRIPTION OF THE DRAWINGS

FIG. 3 is a plan view of the secondary containment liner embodying the principles of the present invention;

FIG. 4 is a cross-sectional view taken generally along lines 4—4 of FIG. 3;

FIG. 5 is a cross-sectional view taken generally along lines 5—5 of FIG. 3 illustrating an edge portion of the present liner;

FIG. 6 is a cross-sectional view taken along lines 6—6 of FIG. 3 further illustrating an edge portion of the containment liner;

FIG. 7 is a cross-sectional view taken along lines 7—7 of FIG. 3 illustrating a guide rope lug with which the containment liner may optionally be provided to facilitate installation in an excavation;

FIG. 8 is a perspective view of a further embodiment of the present containment structure, wherein the structure is configured as a sealable container, such as for transport as illustrated;

FIG. 9 is a cross-sectional view taken along lines 9—9 of FIG. 8; and

FIG. 10 is a cross-sectional view taken along lines 10—10 of FIG. 8.

DETAILED DESCRIPTION

Figure 1:
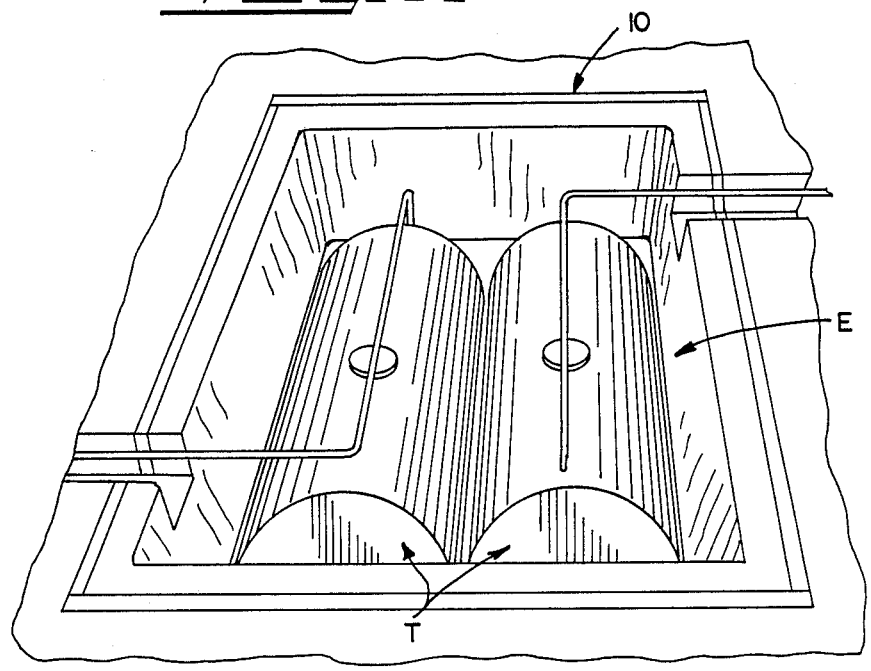
FIG. 1 is a diagrammatic perspective view of a typical underground storage tank installation, with a laminated containment structure embodying the principles of the present invention shown as a secondary containment liner in position beneath the storage tanks of the installation.

While the present invention is susceptible of embodiment in various forms, there is shown in the drawings and will hereinafter be described presently preferred embodiments, with the understanding that the present disclosure is to be considered as an exemplification of the invention, and is not intended to limit the invention to the specific embodiments illustrated.

Referring first to FIG. 1, therein is shown a typical underground storage tank installation for which the present containment structure, when embodied as secondary containment liner 10, is particularly suited. The diagrammatic illustration of FIG. 1 shows a pair of typical steel storage tanks T in position atop of liner 10 within a typical excavation E. As will be recognized by those familiar with the art, the excavation shown in FIG. 1 is typically back-filled after installation of tanks T, thus stabilizing and positioning the tanks within the excavation. While the secondary containment liner 10 is shown in connection with an excavation E for subterranean use, it will be appreciated that a secondary containment embodying the principles of the present invention is equally suited for aboveground use, such as in association with aboveground storage tanks, piping systems, and the like.

With particular reference now to FIGS. 3-7, the preferred features of the liner construction 10 will be discussed. As will be appreciated, a typically-sized secondary containment liner is relatively large, and in its finished form may weigh thousands of pounds. Thus, in order to facilitate efficient manufacture of a construction of a typically unwieldy size and bulk, the present invention contemplates that the structure forming the liner 10 be formed from a plurality of adjacent, elongated laminated strips 12 joined together along their opposite lateral edge portions. By way of example, it is presently preferred that each laminated strip 12 be formed to have a width of several feet, thus promoting efficient manufacture of the laminations, as well as efficient bonding of the strips together, as will be described.

Significantly, the composition of each laminated strip 12 has been selected for very reliable use in containment applications. Each laminated strip 12 first comprises a thermoplastic polyester elastomeric layer 14 which is selected for a high degree of imperviousness to hydrocarbon fuels, solvents, and other corrosive and/or hazardous materials. To this end, the polyester elastomeric layer of each strip preferably comprises DuPont TM Company Hytrel TM HTR-6108, which has been particularly formulated for good flexibility and low permeability to hydrocarbon fuels and oils. In a current embodiment, formation of elastomeric layers 14 to a thickness on the order of 30 mils has proven suitable, with this material exhibiting a nominal durometer hardness of 60D. Of course, other suitably impervious materials may be employed in keeping with the principles disclosed herein.

While the polyester elastomer of the above type exhibits the desired degree of imperviousness to hydrocarbon fuels and the like, it was recognized during the development of the present invention that sheets of this material do not exhibit the necessary degree of puncture-resistance as may be required for all containment applications, and particularly those requiring subterranean installation. Accordingly, it was determined that the required degree of puncture-resistance and resistance to leakage could best be achieved by use of such an elastomer in association with a high-strength fabric or the like. However, during development of the present invention, efforts to provide a containment structure comprising juxtaposed layers of polyester elastomer and geotextile fabric layers met with limited success. Efforts to bond the separate layers with lines of adhesive proved extremely inefficient and time-consuming.

It was thus recognized that a containment construction could best be provided by forming laminated strips such as strips 12 each comprising an elastomeric layer 14, and at least one, and preferably a pair, of associated geotextile fabric layers 16 bonded in face-to-face relation with the respective opposite expansive surfaces of the elastomeric layer. Each of the geotextile fabric layers 16 preferably comprises a continuous filament polyester non-woven needle-punched fabric, with Hoechst Fibers Industries Trevira TM Spunbond Type 11 being presently preferred. In a current embodiment, heatbonded fabric layers 16 having a thickness generally on the order of that of the associated elastomeric layer have been employed. Heat-fused laminations of the above-described materials are presently available from the Bixby International Corporation of Newburyport, Mass.

To provide the liner 10 with the requisite impermeability to fuels and other chemicals, it is necessary that the laterally opposite edge portions of the elastomeric layer 14 of laminated strips 12 be joined or bonded together to form continuous, uninterrupted seams 17. While bonding through the use of adhesives or solvents is within the purview of the present invention, it is presently preferred that bonding be effected by heat-fusing the edges of the elastomeric layers together, preferably by radio frequency welding or sonic welding.

In order to facilitate manufacture in this manner, it is preferred that each one of the geotextile fabric layers 16 be offset or spaced from a respective one of the lateral edge portions of the associated elastomeric layer 14 by a distance "X" (see FIG. 4). Thus, each laminated strip 12 is formed so that opposite edge portions of its elastomeric layer 14 are exposed. As noted, the laminated strips 14 can be readily formed and handled in widths of several feet, with offsets of the fabric layers 16 on the order of one-half inch permitting efficient assembly of the desired number of the strips 12 to form a containment structure of the required dimensions. As will be appreciated, this construction provides a substantially uninterrupted expanse or continuum of the impervious polyester elastomeric layers, with substantially continuous expanses of the geotextile fabric material presented on each side for the strength and puncture-resistance of the integrated assembly.

With further reference to FIGS. 3-7, illustrated features of the containment liner 10 facilitate its installation and securement within an excavation. Handling and securement of the liner 10 is facilitated by the provision of folded border layers 18, 18', respectively positioned on the laterally opposite and longitudinally opposite marginal edges of the joined together laminated strips 12. The border layers may comprise the same material as the elastomeric layers 14 of laminated strips 12, with the inner edge portions of the border layers 18, 18' respectively bonded at 20, 20', such as by radio frequency welding, to the associated elastomeric layers 14 of strips 12 (see FIGS. 5 and 6). In the case of border layers 18' at the longitudinal ends of the assembly, portions of the outer geotextile fabrics 16 can be removed (as shown in phantom line in FIG. 5) to expose the expanse of the elastomeric layers 14 for bonding to the border layers.

Each border layer 18, 18' is preferably folded-under and secured to itself outwardly of the respective inner edge portion. In the preferred form, each border layer is secured to itself by a series of spaced apart grommets 22, with the grommets preferably sized for receiving stakes S to facilitate securing the liner 10 in place (see FIG. 2). Additionally, a reinforcing rope 24 preferably extends substantially continuously within the folded border layers, thereby facilitating handling and movement of the liner.

Figure 2:
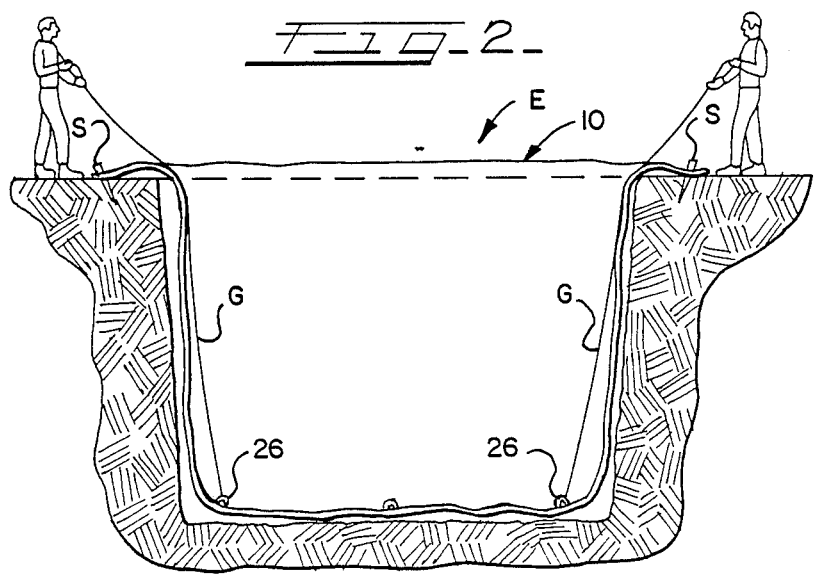
FIG. 2 is a diagrammatic view illustrating installation of the secondary containment liner in an associated excavation.

With reference to FIGS. 2 and 7, handling of the liner construction 10 is further facilitated by the optional provision of a plurality of lugs 26 to which guide ropes G can be secured. As shown in FIG. 7, each lug 26 is integral with an associated base portion 28, which can be suitably bonded, such as by welding, to the elastomeric layer 14 of at least one of the laminated strips 12. To facilitate bonding in this manner, a portion of the upper fabric layer 16 can be removed from the laminated strip.

The plurality of the lugs 26 are preferably positioned generally centrally of the liner 10. As shown in FIG. 2, guide ropes secured to the lugs facilitate proper positioning of the liner in place within an excavation after it has been unfolded or unrolled generally over the excavation. Suitably padded guide poles (not shown) can further be employed for proper positioning of the liner.

Referring now to FIGS. 8-10, a further embodiment of the present containment structure is shown, wherein the structure is configured as a substantially closed, sealable container 30. Container 30 is intended for transport or storage of hazardous or contaminated material, such as by positioning the container in a suitable truck or like transport vehicle V.

In many respects, the construction of container 30 is similar to that of the above containment liner 10. The container comprises a plurality of the laminated strips 12, with edge portions of the strips joined so that the elastomeric layers 14 of the strips are bonded to form a substantially uninterrupted barrier or continuum of the highly impervious elastomeric material. As shown in FIG. 9, at least one of the preferably two outer geotextile fabric layers 16 is preferably offset relative to the edge portion of the associated elastomeric layer to facilitate bonding, as at 32, in this manner.

In order to promote use of container 30 for secure storage or shipment of hazardous material, the container is preferably provided with a sealable closure member 34 sized to facilitate filling of the container, and thereafter permitting the container to be conveniently sealed. To this end, the closure member is preferably of the so-called profiled type, such as available from Minigrip Incorporated, Orangeburg, N.Y. Notably, this type of closure can be formed from the same highly impervious material which comprises the elastomeric layers 14 of the laminated strips 12, thus exhibiting imperviousness to the same types of hazardous and/or corrosive materials, as well as promoting efficient bonding of the closure to the elastomeric layers 14 of the associated strips 12, such as at 36. Further, some types of these closures are configured to substantially prevent re-opening after sealing, as can be desirable for some applications.

Efficient handling of the container 30, both before and after it is filled, is promoted by the provision of a plurality of lugs 26 positioned on the exterior of the container. In accordance with the illustration of FIG. 7, each of the lugs 26 is preferably bonded to the elastomeric layer 14 of the associated laminated strip 12.

Aside from storage and transport of contaminated soil or otherwise hazardous materials, further applications for the sealable container 30 are contemplated. Since it may be undesirable or impractical to transport contaminated material, such as may result from leakage of a storage tank, use of container 30 for on-site decontamination can be desirable. In such an application, the container can be provided with suitable venting arrangements, as well as sensing probes for monitoring contamination levels. Material to be decontaminated can then be placed in the container, together with suitable anaerobic bacteria or another decontamination agent, and the container substantially sealed with closure member 34. When the contents are no longer hazardous, they can be removed from the container and conveniently handled.

The sealable container 30 can further be used in the nature of a secondary containment. For this application, the container is sized for fitment to a storage tank or like vessel, and is sealed about the vessel by means of a closure member 34. To facilitate continued access to the vessel, such as for inspection or maintenance, the geotextile fabric of the container can be removed as required at selected portions of the container before installation. This permits the associated elastomeric material to be secured to man-ways or other access openings so that their use is not prevented by the container. The container thus functions to contain and confine material which may leak or be otherwise lost from the associated storage vessel.

From the foregoing, it will be observed that numerous modifications and variations can be effected without departing from the true spirit and scope of the novel concept of the present invention. It is to be understood that no limitation with respect to the specific embodiments illustrated herein is intended or should be inferred. The disclosure is intended to cover by the appended claims all such modifications as fall within the scope of the claims.

What is claimed is:

1. A laminated containment structure, comprising:
   a plurality of adjacent, elongated laminated strips joined together along their opposite edge portions to form said containment structure;
   each said laminated strip comprising a lamination of an elastomeric layer, and two geotextile fabric layers each bonded in face-to-face relation with a respective one of the opposite expansive surfaces of said elastomeric layer;
   each said geotextile fabric layer of each said laminated strip being offset relative to a respective one of the opposite lateral edge portions of the respective elastomeric layer by a predetermined spacing to facilitate bonding of the elastomeric layers of adjacent ones of said laminated strips;
   said elastomeric layer of each said laminated strip being continuously bonded in overlapping relationship directly to the elastomeric layer of each adjacent one of said laminated strips, with the overlapping portions of the elastomeric layers of adjacent ones of said strips generally corresponding in dimension to said predetermined spacing of each said geotextile fabric layers relative to its respective lateral edge portion of the respective elastomeric layer to form said containment structure with a substantially uninterrupted continuum of said elastomeric layers of said adjacent laminated strips and with substantially continuous expanses of said geotextile fabric layers on opposite expansive surfaces of said uninterrupted continuum of said elastomeric layers.

2. A laminated containment structure in accordance with claim 1, wherein
   said geotextile fabric layer of each said laminated strip comprises polyester, needle-punched nonwoven fabric, and said elastomeric layer of each said laminated strip comprises a thermoplastic polyester elastomer.

* * * * *